Aug. 24, 1965    J. L. BYRD    3,201,999
FLUID ACCELEROMETER
Filed June 7, 1963
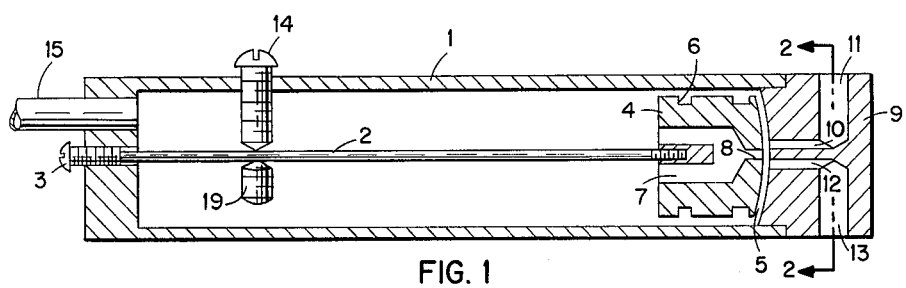
FIG. 1
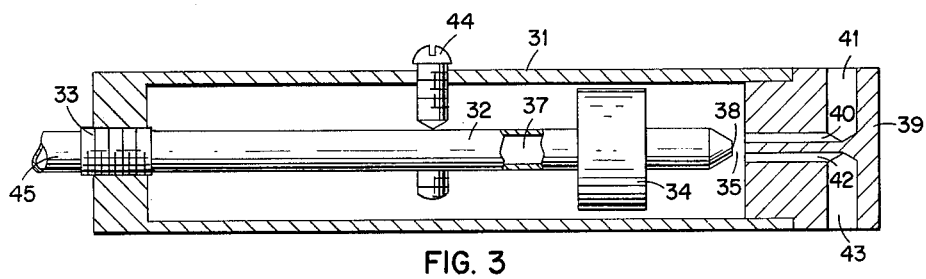
FIG. 3
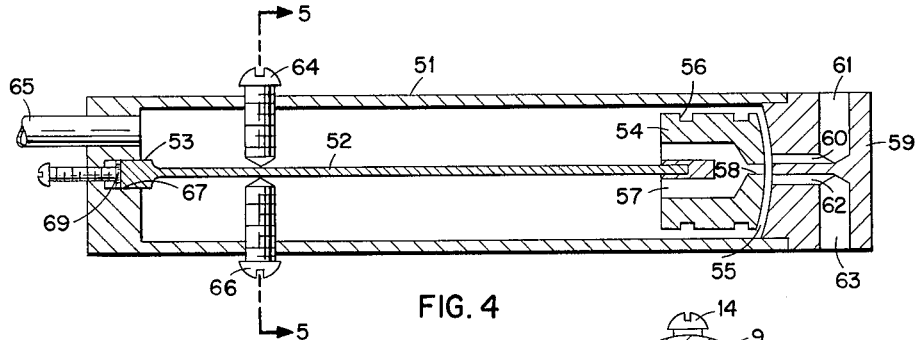
FIG. 4
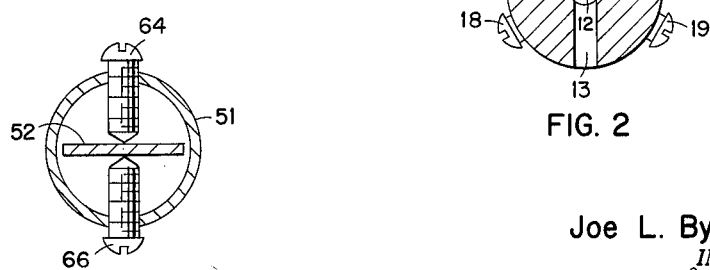
FIG. 5
FIG. 2
Joe L. Byrd,
*INVENTOR.*
Harry M. Saragovitz
BY Edward J. Kelly
Herbert Berl
James E. Staudt

United States Patent Office 3,201,999
Patented Aug. 24, 1965

3,201,999
FLUID ACCELEROMETER
Joe L. Byrd, Huntsville, Ala., assignor to the United States of America as represented by the Secretary of the Army
Filed June 7, 1963, Ser. No. 286,434
10 Claims. (Cl. 73—515)
(Granted under Title 35, U.S. Code (1952), sec. 266)

The invention described herein may be manufactured and used by or for the Government for governmental purposes without the payment of any royalty thereon.

The present invention relates to a fluid operated device for detecting acceleration and position of a missile or other types of vehicles.

It is contemplated that missile systems of the future may utilize pneumatic rather than electronic control systems. Thus, considerable effort has been expended in the design of an accelerometer adaptable to this type of system. The herein described fluid accelerometer has proved to be dependable, accurate and simple. Electronic accelerometers have generally proved to be quite complicated and delicate, and in some cases undependable when subjected to the severe operational conditions which a missile system must endure.

One object of this invention is to provide an accelerometer which is operated solely by fluid.

Another object of this invention is to provide a device which produces a fluid output proportional to acceleration.

Another object is to provide a fluid operated accelerometer having a minimum of moving parts.

Still another object is to utilize the deflection principle of a cantilever beam to effect a definite change in various fluid outputs of the device.

A further object is to provide a device which will detect the static position of a missile relative to the horizontal.

These and other objects and advantages of the present invention will become apparent from the following description taken in conjunction with the accompanying drawings wherein:

FIGURE 1 is a sectional view of the device showing one outlet rotated 60° for purposes of clarity;

FIGURE 2 is a sectional view taken on line 2—2 of FIGURE 1 and showing the true angular relationship between the outlets;

FIGURE 3 is a modification of the invention, shown in cross section, wherein a cylindrical beam is utilized;

FIGURE 4 is another modification of the invention, shown in cross section, wherein a rectangular beam is utilized; and FIGURE 5 is a cross section taken on line 5—5 of FIGURE 4.

Referring now to FIGURE 1 a cylindrical housing 1 encloses a solid circular beam 2 which is adjustable by means of a screw 3 rigidly attached to one end thereof. Fluid is fed to the housing through an inlet 15 which is located adjacent screw 3. An inertial nozzle 4 having an inlet chamber 7 and a restricted outlet orifice 8 is threadably attached to the opposite end of beam 2. Receiver block 9 is attached to the end of cylindrical housing 1 adjacent the inertial nozzle and comprises a series of ports 10, 12 and 16 which open into outlet passages 11, 13 and 17 respectively, as best illustrated in FIGURE 2. Inertial nozzle 4 is adjusted by means of screw 3 so as to provide a predetermined clearance 5 between the nozzle and receiver block 9. A number of grooves 6 are cut in the radially outer surface of inertial nozzle 4 so as to equalize any pressure differential which may occur around the circumferential surface of the nozzle due to leakage through the clearance 5. A series of adjusting screws 14, 18 and 19, best illustrated in FIGURE 2, may be utilized to position the inertial nozzle in any desired angular position relative to ports 10, 12 and 16.

The modification illustrated in FIGURE 3 utilizes a hollow beam 32 having an inertial mass 34 located adjacent a nozzle outlet 38. In this device incoming fluid is supplied through the hollow beam thus eliminating the need for a separate inlet. The sensing characteristics of this modification are slightly different from those of the original embodiment in that the bending characteristics of a hollow cantilever beam are somewhat different than those of a solid beam. Cylindrical housing 31 as well as receiver block 39 of this modification are basically the same as those utilized in the original embodiment.

FIGURES 4 and 5 illustrate still another modification which differs from the original embodiment in that a rectangular beam 52 is utilized to support inertial nozzle 54. Clearance 55 between inertial nozzle 54 and receiver block 59 may be varied by means of adjusting screw 68 which is attached to beam 52 by means of a rotatable connection 69. Thus screw 68 is rotatably attached to an enlarged portion 53 of beam 52. A rectangular slot 67 is provided in the end wall of cylindrical housing 51 for reception of the enlarged portion 53 of beam 52. In order to prevent excess air leakage and rotary movement of beam 52 the surfaces of enlarged portion 53 and slot 67 are machined to provide a snug fit. Referring now to FIGURE 5, it will be noted that because of the rectangular configuration of beam 52 only two positioning screws 64 and 66 are necessary for angular adjustment of inertial nozzle 54. It will also be noted that movement in the plane of the beam 52 is for all practical purposes eliminated. Cylindrical housing 51 and receiver block 59 of this modification are essentially the same design as those illustrated in previous embodiments.

In operation of the device illustrated in FIGURE 1 fluid is admitted into cylindrical housing 1 through the inlet passage 15, flows through passage 7 of the inertial nozzle, into restriction 8 and is exhausted via one or more of the ports 10, 12 and 16 into the outlets 11, 13 and 17, respectively. Because of the flexibility of cantilever beam 2 and the mass of the inertial nozzle 4, acceleration of the device will cause the beam to deflect thereby moving the nozzle orifice 8 relative to the ports 10, 12 and 16. A measure of the rate of flow exhausting from each of the individual outlets will indicate the relative position of the inertial nozzle within the cylindrical housing thus providing a means for sensing the rate and direction of the acceleration of the device. The beam flexibility characteristics may be varied to meet the requirements of the vehicle on which the accelerometer is to be used. Use of an extremely flexible beam will, of course, permit sensing of the static position of the device. Some leakage of fluid will occur through clearance 5 between the nozzle and the receiver block. This leakage will recirculate and return through passages 7 and 8 to be exhausted with the main stream of fluid. Clearance 5 may be varied by means of adjusting screw 3 and, as mentioned hereinabove, adjusting screws 14, 18 and 19 may be utilized to preset the desired angular position of the inertial nozzle. The operation of the modification shown in FIGURES 3 and 4 is the same as that of the original embodiment except that in FIGURE 3 fluid is received into the device through the inlet 45 of the hollow beam 32. The weighted portion 34 of the inertial nozzle of the device shown in FIGURE 3, may be adjusted longitudinally of the beam so as to control the deflection characteristics of the beam. The modification shown in FIGURE 4 is primarily operative in only two directions due to the construction of the rectangular beam. The characteristics of the accelerometer may be controlled by varying the cross-sectional shape and size of the beam as well as the size and shape of the ports.

While the foregoing is a description of the preferred embodiment, the following claims are intended to include those modifications and variations that are within the spirit and scope of my invention.

I claim:

1. A fluid accelerometer comprising a hollow housing having an inlet at one end, a receiver block closing the opposite end of said housing, a plurality of outlet passages formed in said receiver block, a plurality of ports in said receiver block equally arranged about a center line through said block, each of said ports connecting one of said outlet passages to the interior of said housing, a cantilever beam attached to the inlet end of said housing, an inertial nozzle attached to the distal end of said beam, a passage means located in said nozzle for conducting fluid from the inlet to one or more of said ports said beam being adjustably connected to said housing for axial movement toward and away from said receiver block, and adjusting means attached to the housing and contacting the beam for adjusting the beam in a path perpendicular to the longitudinal axis of the beam.

2. A device as set forth in claim 1 wherein said beam is hollow, said hollow beam being directly connected to said inlet.

3. A device as set forth in claim 2 wherein an inertial mass is adjustably mounted adjacent the outlet end of said beam.

4. A device as set forth in claim 1 wherein said beam is rectangular.

5. A device as set forth in claim 1 wherein said beam is a circular rod.

6. A device as set forth in claim 1 wherein said inertial nozzle has annular grooves formed in its radially outer surface.

7. A fluid accelerometer comprising; a hollow cylindrical housing having one closed end and a receiver block closing the opposite end, a plurality of outlet passages formed in said receiver block, a plurality of ports in said receiver block equally arranged about a center line through said block, each of said ports connecting one of said outlet passages to the interior of said housing, a cantilever beam adjustably mounted to said one closed end, for adjustment toward and away from said receiver block, an inertial nozzle attached to the distal end of said beam and having opposite faces, chamber means in said inertial nozzle for communicating fluid from one of said opposite faces to a restricted outlet orifice at the other of said opposite faces, inlet means for communicating fluid into said housing, said outlet orifice being adjacent to and adapted to move relative to said ports to vary the amount of flow out each of said ports, and adjusting means attached to said housing and contacting said beam for adjusting said beam in at least one path perpendicular to the longitudinal axis of said beam.

8. A fluid accelerometer as set forth in claim 7, wherein said inertial nozzle has annular grooves formed in its radially outer surface.

9. A fluid accelerometer comprising; a hollow cylindrical housing having one closed end and a receiver block closing the opposite end, a plurality of outlet passages formed in said receiver block, a plurality of ports in said receiver block equally arranged about a center line through said block, each of said ports connecting one of said outlet passages to the interior of said housing, a hollow cantilever beam adjustably mounted at one end in said one closed end for adjustment toward and away from said receiver block, an inertial mass mounted on said hollow beam near the opposite end of said hollow beam, said opposite end having a nozzle outlet adjacent said ports, and means for communicating fluid to said nozzle outlet through said hollow beam.

10. A fluid accelerometer as set forth in claim 9, whereing adjusting screw means are attached to said housing and contact said hollow beam for adjusting said beam in at least one path perpendicular to the longitudinal axis of said beam to adjust said nozzle outlet relative to said ports.

References Cited by the Examiner

UNITED STATES PATENTS

| 2,154,678 | 4/39 | Hawthorne | 33—215.3 |
| 2,219,243 | 10/40 | Kollsman | 74—5.43 |
| 2,315,500 | 4/43 | Carter | 74—5.43 |
| 2,440,342 | 4/48 | Mayne | 73—517 |
| 2,665,896 | 1/54 | Kirby | 73—516 |
| 2,835,772 | 5/58 | DiGiovanni | 73—517 |
| 3,077,783 | 2/63 | Stiles | 73—517 |

FOREIGN PATENTS 158,630  4/57  Sweden.

RICHARD C. QUEISSER, *Primary Examiner.*

JAMES J. GILL, *Examiner.*